US010472455B2

(12) United States Patent
Laas et al.

(10) Patent No.: US 10,472,455 B2
(45) Date of Patent: Nov. 12, 2019

(54) SILANE GROUPS CONTAINING POLYISOCYANATES BASED ON 1,5-DIISOCYANATOPENTANE

(71) Applicant: Covestro Deutschland AG, Leverkusen (DE)

(72) Inventors: Hans-Josef Laas, Odenthal (DE);
Christoph Eggert, Köln (DE);
Andreas Hecking, Langenfeld (DE);
Nusret Yuva, Burscheid (DE); Gesa Behnken, Köln (DE)

(73) Assignee: Covestro Deutschland AG, Leverkusen (DE)

(*) Notice: Subject to any disclaimer, the term of this patent is extended or adjusted under 35 U.S.C. 154(b) by 0 days.

(21) Appl. No.: 15/558,714

(22) PCT Filed: Mar. 10, 2016

(86) PCT No.: PCT/EP2016/055133
§ 371 (c)(1),
(2) Date: Sep. 15, 2017

(87) PCT Pub. No.: WO2016/146474
PCT Pub. Date: Sep. 22, 2016

(65) Prior Publication Data
US 2018/0112026 A1   Apr. 26, 2018

(30) Foreign Application Priority Data

Mar. 17, 2015   (EP) .................................... 15159507

(51) Int. Cl.
| | |
|---|---|
| C08G 18/28 | (2006.01) |
| C08G 18/62 | (2006.01) |
| C08G 18/73 | (2006.01) |
| C08G 18/79 | (2006.01) |
| C08G 18/80 | (2006.01) |
| C08G 18/02 | (2006.01) |
| C08G 18/18 | (2006.01) |
| C08G 18/20 | (2006.01) |
| C09D 175/04 | (2006.01) |
| C08K 5/5415 | (2006.01) |

(52) U.S. Cl.
CPC ......... C08G 18/289 (2013.01); C08G 18/022 (2013.01); C08G 18/1875 (2013.01); C08G 18/2063 (2013.01); C08G 18/6229 (2013.01); C08G 18/73 (2013.01); C08G 18/792 (2013.01); C08G 18/809 (2013.01); C08K 5/5415 (2013.01); C09D 175/04 (2013.01)

(58) Field of Classification Search
CPC ............................. C08G 18/289; C08G 18/09
See application file for complete search history.

(56) References Cited

U.S. PATENT DOCUMENTS

| | | | |
|---|---|---|---|
| 4,613,686 A | 9/1986 | König et al. | |
| 4,788,310 A | 11/1988 | Stein et al. | |
| 4,826,915 A | 5/1989 | Stein et al. | |
| 4,837,359 A | 6/1989 | Woynar et al. | |
| 4,960,848 A | 10/1990 | Scholl et al. | |
| 4,994,541 A | 2/1991 | Dell et al. | |
| 5,076,958 A | 12/1991 | Pedain et al. | |
| 5,126,170 A | 6/1992 | Zwiener et al. | |
| 5,252,696 A | 10/1993 | Laas et al. | |
| 5,364,955 A | 11/1994 | Zwiener et al. | |
| 5,854,338 A | 12/1998 | Hovestadt et al. | |
| 5,914,383 A | 6/1999 | Richter et al. | |
| 6,005,047 A | 12/1999 | Shaffer et al. | |
| 6,057,415 A | 5/2000 | Roesler et al. | |
| 6,426,414 B1 | 7/2002 | Laas et al. | |
| 6,767,958 B2 | 7/2004 | Laas et al. | |
| 8,044,166 B2 | 10/2011 | Fiene et al. | |
| 8,434,939 B2 | 5/2013 | Miteva et al. | |
| 8,658,752 B2 | 2/2014 | Groenewolt et al. | |
| 9,017,818 B2 | 4/2015 | Groenewolt | |
| 9,328,257 B2 | 5/2016 | Groenewolt et al. | |
| 9,353,287 B2 | 5/2016 | Groenewolt et al. | |
| 9,376,404 B2 | 6/2016 | Nakagawa et al. | |
| 2002/0160199 A1 | 10/2002 | Hofacker et al. | |
| 2003/0027921 A1 | 2/2003 | Speier et al. | |
| 2005/0032974 A1 | 2/2005 | Krebs et al. | |

(Continued)

FOREIGN PATENT DOCUMENTS

| | | |
|---|---|---|
| CA | 1335990 | 6/1995 |
| EP | 2684867 A1 | 1/2014 |
| GB | 1145952 | 3/1969 |
| JP | 2005015644 | 1/2005 |
| JP | 2010121011 | 6/2010 |
| JP | 2010254764 | 11/2010 |
| JP | 2010265364 | 11/2010 |
| JP | 2011201863 | 10/2011 |

(Continued)

OTHER PUBLICATIONS

Laas, et al, The Synthesis of Aliphatic Polyisocyanates Containing Biuret, Isocyanurate or Uretdione Backbones for Use in Coatings, J. Prakt. Chem. 336, (1994), pp. 185-200.
Laas, et al, The Synthesis of Aliphatic Polyisocyanates Containing Biuret, Isocyanurate or Uretdione Backbones for Use in Coatings, J. Prakt. Chem. 336, (1994), pp. 185-200 (Translation attached).

* cited by examiner

Primary Examiner — Kuo Liang Peng
(74) Attorney, Agent, or Firm — John E. Mrozinski, Jr.

(57) ABSTRACT

The invention relates to modified polyisocyanates, obtained by reacting at least one polyisocyanate (A) based on 1,5-diisocyanatopentane with at least one silane compound (B) which is reactive with respect to isocyanate groups. The invention also relates to a method for producing the modified polyisocyanates and to the use thereof as starting components in the production of polyurethane plastics, in particular as crosslinker components in polyurethane paints and coatings.

17 Claims, No Drawings

(56) References Cited

U.S. PATENT DOCUMENTS

2014/0065313 A1\* 3/2014 Groenewolt .......... C08G 18/10
427/387
2016/0122583 A1 5/2016 Groenewolt et al.

FOREIGN PATENT DOCUMENTS

| JP | 2012152202 | 8/2012 |
| JP | 2013060542 | 4/2013 |
| WO | 2012/065942 A1 | 5/2012 |
| WO | 2014/086530 A1 | 6/2014 |

SILANE GROUPS CONTAINING POLYISOCYANATES BASED ON 1,5-DIISOCYANATOPENTANE

CROSS REFERENCE TO RELATED APPLICATIONS

This application is a national stage application under 35 U.S.C. § 371 of PCT/EP2016/055133, filed Mar. 10, 2016 which claims benefit of European Application No. 15159507.1, filed Mar. 17, 2015 and which are incorporated by reference herein.

FIELD OF THE INVENTION

The invention relates to polyisocyanate mixtures that contain silane groups and are based on 1,5-diisocyanatopentane, to a process for preparing them, and to the use thereof as a starting component in the production of polyurethane plastics, more particularly as a crosslinker component in polyurethane paints and coatings.

BACKGROUND OF THE INVENTION

Polyisocyanate mixtures containing alkoxysilane groups have been known for some considerable time. Products of this kind, which as well as the isocyanate group contain a second reactive structure, in other words a structure capable of crosslinking, have been used in the past in various polyurethane systems and polyurethane applications with the aim of obtaining specific properties, such as, for example, to improve the adhesion, chemical resistance or scratch resistance of coatings.

By way of example, WO 03/054049 describes isocyanate-functional silanes, prepared from aliphatic or cycloaliphatic polyisocyanates of low monomer content and from secondary aminopropyltrimethoxysilanes, as adhesion promoters for polyurethane hotmelt adhesives.

According to the teaching of JP-A 2005-015644 as well, polyisocyanates or isocyanate prepolymers that are modified with N substituted, i.e., secondary, aminopropylalkoxysilanes can be used to improve the adhesion of adhesives and sealants.

EP-B 0 994 139 claims reaction products of aliphatic and/or cycloaliphatic polyisocyanates with substoichiometric amounts of alkoxysilane-functional aspartic esters, as described in EP 0 596 360 as coreactants for isocyanate-functional compounds, and optionally with polyethylene oxide polyether alcohols, as binders for one-component, moisture-crosslinking coatings, adhesives or sealants featuring accelerated curing.

Reaction products of aliphatic and/or cycloaliphatic polyisocyanates with substoichiometric amounts of alkoxysilane-functional aspartic esters or secondary aminoalkylsilanes are also described in WO 02/058569 as crosslinker components for two-component polyurethane adhesion primers.

EP-B 0 872 499 describes aqueous, two-component polyurethane coating materials which as a crosslinker component comprise compounds containing isocyanate groups and alkoxysilyl groups. The use of these specific polyisocyanates leads to coatings having improved water resistance in conjunction with high gloss.

Hydrophilically modified polyisocyanates containing alkoxysilane groups, which are therefore easier to emulsify, have likewise already been identified as crosslinker components for aqueous 2K (two-component) coatings dispersions and adhesives dispersions (e.g. EP-A 0 949 284).

Particular significance is possessed by polyisocyanates containing silane groups for the production of scratch-resistant coatings.

To improve the scratch resistance of solvent borne thermosetting 2K automotive PU clearcoat and topcoat materials, there have been suggestions of reaction products of aliphatic and/or cycloaliphatic polyisocyanates with N,N-bis(trialkoxysilylpropyl)amines as a crosslinker component (EP-A 1 273 640).

A number of further publications likewise describe coating compositions for production of weathering-stable, scratch-resistant clearcoat layers for OEM automotive production line finishing and automotive refinishing, in which crosslinker components used are reaction products of aliphatic and/or cycloaliphatic polyisocyanates with molar deficiency amounts of alkoxysilanes that are reactive toward isocyanate groups. Suitable reactive alkoxysilanes mentioned are especially specific mixtures of bis(alkoxysilylalkyl)amines with N-alkylmono(alkoxysilylalkyl)amines (e.g. WO 2008/074489, WO 2008/074490, WO 2010/149236 and WO 2014/086530), mercaptoalkylalkoxysilanes and/or secondary alkoxysilylalkylamines (e.g. WO 2009/156148).

By far the majority of the known polyisocyanates that contain silane groups and are commercially available on the market derive from polyisocyanates, especially polyisocyanurate polyisocyanates, of 1,6-diisocyanatohexane (hexamethylene diisocyanate, HDI).

Alkoxysilane-modified HDI polyisocyanates have good compatibility with a multitude of different paint binders and lead to coatings of high gloss and high transparency that are especially notable for very good resistance to scratching because of their self-healing properties. Under "reflow" conditions, i.e. brief heating to temperatures above the glass transition temperature (Tg), fine scratches, once they have been inflicted on such paints, heal to such an extent that gloss is restored to close to the starting gloss of the unscratched paint film.

For a number of applications, for example for automotive refinishing and especially OEM automotive production line finishing, there is a constant demand for coating compositions having further-improved scratch resistance. Of particular interest here are 2K PU coating materials having "true" scratch resistance, i.e. those where scratching leads only to a very small loss of gloss per se and there is no reliance on a reflow effect with regard to maintenance of optical quality.

SUMMARY OF THE INVENTION

The present invention provides novel polyisocyanates containing silane groups that are suitable for all fields of use of polyisocyanates containing silane groups and, especially in combination with standard paint binders, give rise to coatings that have a distinctly higher scratch resistance than those that have been produced using the known prior art HDI polyisocyanates containing silane groups, and at the same time are not inferior to these in any way with regard to other paint properties.

This was achieved by the provision of the inventive polyisocyanates or polyisocyanate mixtures based on 1,5-diisocyanatopentane (PDI), said polyisocyanates containing silane groups and being described hereinafter.

PDI derivatives that contain silane groups and could be used as crosslinking agents for production of scratch-resistant polyurethane coatings were unknown to date.

DETAILED DESCRIPTION OF THE INVENTION

These and other advantages and benefits of the present invention will be apparent from the Detailed Description of the Invention herein below.

The present invention provides modified polyisocyanates obtainable by reacting at least one polyisocyanate A) based on 1,5-diisocyanatopentane with at least one silane compound B) reactive toward isocyanate groups.

The invention also provides a process for preparing the modified polyisocyanates of the invention, characterized in that at least A) one polyisocyanate based on 1,5-diisocyanatopentane is reacted with B) at least one silane compound reactive toward isocyanate groups.

The invention further provides for the use of the modified polyisocyanates or of mixtures comprising the modified polyisocyanates as starting components for production of polyurethane plastics, and coating compositions comprising the modified polyisocyanates or mixtures comprising the modified polyisocyanates.

The inventive hydrophilically modified polyisocyanate mixtures based on 1,5-diisocyanatopentane are prepared using starting polyisocyanates A) and at least one silane compound B) reactive toward isocyanate groups.

Polyisocyanates A) for production of the inventive polyisocyanate mixtures containing silane groups are any oligomeric polyisocyanates that are obtainable by modification of 1,5-diisocyanatopentane and have uretdione, isocyanurate, allophanate, biuret, iminooxadiazinedione and/or oxadiazinetrione structure or any desired mixtures of such PDI polyisocyanates. These polyisocyanates are prepared by methods known per se for isocyanate oligomerization, as described by way of illustration, for example, in *J. Prakt. Chem.* 336 (1994) 185-200 and EP-A 0 798 299, by converting some of the isocyanate groups in the PDI to form polyisocyanate molecules consisting of at least two diisocyanate molecules, generally followed by a distillative or extractive removal of the unconverted monomeric PDI. Specific examples of such oligomeric PDI polyisocyanates can be found, for example, in EP-A 2 418 198, EP-A 2 684 867, JP 2010-121011, JP 2010-254764, JP 2010-265364, JP 2011-201863, JP 2012-152202 or JP 2013-060542.

The 1,5-diisocyanatopentane used for preparation of the polyisocyanates A) is obtainable in various ways, for example by phosgenation in the liquid or gas phase or by a phosgene-free route, for example by thermal urethane cleavage proceeding from 1,5-diaminopentane obtained preferably by means of biotechnology via decarboxylation of the naturally occurring amino acid lysine.

In the preparation of the polyisocyanates A), as well as 1,5-diisocyanatopentane, it is optionally possible to use further diisocyanates having aliphatically, cycloaliphatically, araliphatically and/or aromatically bonded isocyanate groups. These are especially those from the molecular weight range of 140 to 400, for example 1,4-diisocyanatobutane, 1,6-diisocyanatohexane (HDI), 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 2,4- and 2,6-diisocyanato-1-methylcyclohexane, 1,3- and 1,4-bis(isocyanatomethyl)cyclohexane, 1-isocyanato-3,3,5-trimethyl-5-isocyanatomethylcyclohexane (isophorone diisocyanate, IPDI), 4,4'-diisocyanatodicyclohexylmethane, 2,4'-diisocyanatodicyclohexylmethane, 1-isocyanato-1-methyl-4(3)isocyanatomethylcyclohexane, bis(isocyanatomethyl)-norbornane, 1,3- and 1,4-bis(isocyanatomethyl)benzene (XDI), 1,3- and 1,4-bis(2-isocyanatoprop-2-yl)benzene (TMXDI), 2,4- and 2,6-diisocyanatotoluene (TDI), 2,4'- and 4,4'-diisocyanatodiphenylmethane (MDI), 1,5-diisocyanatonaphthalene or any desired mixtures of such diisocyanates.

These diisocyanates for optional use in the preparation of the starting polyisocyanates A), if used at all, are used in amounts of up to 80% by weight, preferably up to 50% by weight and more preferably up to 20% by weight, based on the total amount of diisocyanates used.

Especially preferred starting compounds A) are polyisocyanates that contain isocyanurate structures, have been prepared using PDI as the sole diisocyanate and have a mean NCO functionality of 2.3 to 5.0, preferably of 2.5 to 4.5, an isocyanate group content of 11.0% to 26.0% by weight, preferably of 13.0% to 25.0% by weight, and a monomeric PDI content of less than 1.0% by weight, preferably less than 0.5% by weight.

In a particularly advantageous embodiment of the invention, the polyisocyanate A) is an oligomeric polyisocyanate consisting of at least two 1,5-diisocyanatopentane molecules and having uretdione, isocyanurate, allophanate, biuret, iminooxadiazinedione and/or oxadiazinetrione structure, or any desired mixtures of such polyisocyanates.

In a further advantageous embodiment of the invention, the polyisocyanate A) is at least one oligomeric polyisocyanate consisting of at least two 1,5-diisocyanatopentane molecules and having a) a mean isocyanate functionality of 2.0 to 5.0 and b) an isocyanate group content of 11.0% to 26.0% by weight.

Silane compounds B) of the invention are any compounds that are reactive toward isocyanate groups and have at least one silane group.

Suitable starting compounds B) are, for example, aminosilanes of the general formula (I)

(I)

in which $R^1$, $R^2$ and $R^3$ are identical or different radicals and are each a saturated or unsaturated, linear or branched, aliphatic or cycloaliphatic or an optionally substituted aromatic or araliphatic radical which has up to 18 carbon atoms and may optionally contain up to 3 heteroatoms from the group of oxygen, sulfur and nitrogen, X is a linear or branched organic radical which has at least 2 carbon atoms and may optionally contain up to 2 imino groups (—NH—), and $R^4$ is hydrogen, a saturated or unsaturated, linear or branched, aliphatic or cycloaliphatic or an optionally substituted aromatic or araliphatic radical having up to 18 carbon atoms or a radical of the formula

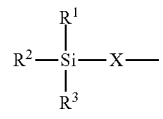

in which R¹, R², R³ and X have the definition given above.

Suitable aminosilanes of the general formula (I) are, for example, 3-aminopropyltrimethoxysilane, 3-aminopropyltriethoxysilane, 3-aminopropylmethyldimethoxysilane, 3-aminopropylmethyldiethoxysilane, 3-aminopropyl-ethyldiethoxysilane, 3-aminopropyldimethylethoxysilane, 3-aminopropyl-diisopropylethoxysilane, 3-aminopropyl-tripropoxysilane, 3-aminopropyl-tributoxysilane, 3-aminopropylphenyldiethoxysilane, 3-aminopropylphenyl-dimethoxysilane, 3-aminopropyltris(methoxyethoxyethoxy)silane, 2-aminoisopropyltrimethoxysilane, 4-aminobutyltrimethoxysilane, 4-aminobutyltriethoxysilane, 4-aminobutylmethyldimethoxysilane, 4-aminobutylmethyldiethoxysilane, 4-aminobutylethyldimethoxysilane, 4-aminobutylethyldiethoxysilane, 4-aminobutyldimethylmethoxysilane, 4-aminobutylphenyldimethoxysilane, 4-aminobutylphenyldiethoxysilane, 4-amino(3-methylbutyl)methyldimethoxysilane, 4-amino(3-methylbutyl)-methyldiethoxysilane, 4-amino(3-methylbutyl)trimethoxysilane, 3-aminopropylphenylmethyl-n-propoxysilane, 3-aminopropylmethyldibutoxysilane, 3-aminopropyldiethylmethylsilane, 3-aminopropylmethyl-bis(trimethylsiloxy)silane, 11-aminoundecyltrimethoxysilane, N-methyl-3-aminopropyltrimethoxysilane, N-methyl-3-aminopropyltriethoxysilane, N-(n-butyl)-3-aminopropyltrimethoxysilane, N-(n-butyl)-3-aminopropyltriethoxysilane, N-(2-aminoethyl)-3-aminopropyltrimethoxysilane, N-(2-aminoethyl)-3-aminoisobutylmethyldimethoxysilane, N-(2-aminoethyl)-3-aminopropylmethyldimethoxysilane, N-(2-aminoethyl)-3-aminopropyltris(2-ethylhexoxy)silane, N-(6-aminohexyl)-3-aminopropyltrimethoxysilane, N-benzyl-N-(2-aminoethyl)-3-aminopropyltrimethoxysilane, bis(3-trimethoxysilylpropyl)amine, bis(3-triethoxysilylpropyl)amine, (aminoethylaminomethyl)-phenethyltrimethoxysilane, N-vinylbenzyl-N-(2-aminoethyl)-3-aminopropylpolysiloxane, N-vinylbenzyl-N(2-aminoethyl)-3-aminopropylpolysiloxane, 3-ureidopropyltriethoxysilane, 3-(m-aminophenoxy)propyltrimethoxysilane, m- and/or p-aminophenyl-trimethoxysilane, 3-(3-aminopropoxy)-3,3-dimethyl-1-propenyltrimethoxysilane, 3-aminopropylmethylbis(trimethylsiloxy)silane, 3-aminopropyltris(trimethylsiloxy)silane, 3-aminopropylpentamethyldisiloxane or any desired mixtures of such aminosilanes.

Preferred aminosilanes of the general formula (I) are those in which

R¹, R² and R³ are each alkyl radicals having up to 6 carbon atoms and/or alkoxy radicals which contain up to 3 oxygen atoms, with the proviso that at least one of the R¹, R² and R³ radicals is an alkoxy radical of this kind, X is a linear or branched alkylene radical having 3 or 4 carbon atoms, and R⁴ is a saturated linear or branched, aliphatic or cycloaliphatic radical having up to 6 carbon atoms or a radical of the formula

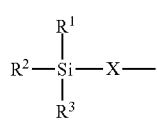

in which R¹, R², R³ and X have the definition given above.

Particularly preferred aminosilanes of the general formula (I) are those in which R¹, R² and R³ are each independently methyl, methoxy, or ethoxy, with the proviso that at least one of the R¹, R² and R³ radicals is a methoxy or ethoxy radical, X is a propylene radical (—CH₂—CH₂—CH₂—), and R⁴ is a linear alkyl radical having up to 4 carbon atoms or a radical of the formula

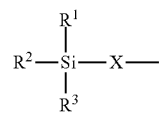

in which R¹, R², R³ and X have the definition given above.

Very particularly preferred aminosilanes of the general formula (I) are N-methyl-3-aminopropyltrimethoxysilane, N-methyl-3-aminopropyltriethoxysilane, N-(n-butyl)-3-aminopropyltrimethoxysilane, N-(n-butyl)-3-aminopropyltriethoxysilane, bis(3-trimethoxysilylpropyl)amine and/or bis(3-triethoxysilylpropyl)amine.

Suitable silane compounds B) are, for example, also aminosilanes of the general formula (II)

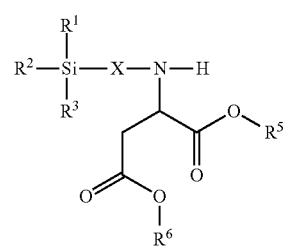

in which IV, R² and R³ have the definition given for formula (I),

X is a linear or branched organic radical having at least 2 carbon atoms and

R⁵ and R⁶ are independently saturated or unsaturated, linear or branched, aliphatic or cycloaliphatic or aromatic organic radicals which have 1 to 18 carbon atoms, are substituted or unsubstituted and/or have heteroatoms in the chain.

These aminosilanes of the general formula (II) are the known silane-functional aspartic esters as obtainable according to the teaching of EP-A 0 596 360 by reacting aminosilanes bearing primary amino groups with fumaric esters and/or maleic esters.

Suitable starting compounds for preparation of aminosilanes of the general formula (II) are therefore, in principle, any aminosilanes of the general formula (I)

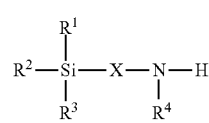

in which IV, R², R³ and X have the definition given for formula (II) and R⁴ is hydrogen.

These are reacted with fumaric diesters and/or maleic diesters of the general formula (III)

$$R^7OOC-CH=CH-COOR^8 \quad (III)$$

in which the $R^7$ and $R^8$ radicals are identical or different radicals and are organic radicals having 1 to 18, preferably 1 to 9 and more preferably 1 to 4 carbon atoms.

Preferred aminosilanes of the general formula (II) are reaction products of aminosilanes of the general formula (I) in which
$R^1$, $R^2$ and $R^3$ are each independently methyl, methoxy, or ethoxy, with the proviso that at least one of the $R^1$, $R^2$ and $R^3$ radicals is a methoxy or ethoxy radical,
X is a propylene radical ($-CH_2-CH_2-CH_2-$), and
R4 is hydrogen,
with
fumaric diesters and/or maleic diesters of the general formula (III) in which the $R^7$ and $R^8$ radicals are identical or different radicals and are a methyl, ethyl, n-butyl or 2-ethylhexyl radical.

Particularly preferred aminosilanes of the general formula (II) are reaction products of 3-aminopropyltrimethoxysilane and/or 3-aminopropyltriethoxysilane with diethyl maleate.

Suitable starting compounds B) are, for example, also aminosilanes of the general formula (IV)

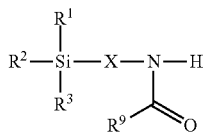

(IV)

in which $R^1$, $R^2$ and $R^3$ have the definition given for formula (I),
X is a linear or branched organic radical having at least 2 carbon atoms and
$R^9$ is a saturated linear or branched, aliphatic or cycloaliphatic organic radical having 1 to 8 carbon atoms.

These aminosilanes of the general formula (IV) are the known silane-functional alkylamides as obtainable, for example, by the methods disclosed in U.S. Pat. Nos. 4,788,310 and 4,826,915, by reacting aminosilanes bearing primary amino groups with alkyl esters of alkylcarboxylates with elimination of alcohol.

Suitable starting compounds for preparation of aminosilanes of the general formula (IV) are therefore, in principle, any aminosilanes of the general formula (I)

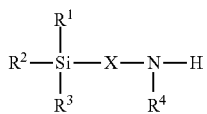

(I)

in which $R^1$, $R^2$, $R^3$ and X have the definition given for formula (II) and $R^4$ is hydrogen.

These are reacted with alkyl alkylcarboxylates of the general formula (V)

$$R^9-COOR^{10} \quad (V)$$

in which
$R^9$ is hydrogen or a saturated linear or branched, aliphatic or cycloaliphatic organic radical having 1 to 8 carbon atoms and $R^{10}$ is a saturated aliphatic organic radical having 1 to 4 carbon atoms.

Preferred aminosilanes of the general formula (IV) are reaction products of aminosilanes of the general formula (I) in which
$R^1$, $R^2$ and $R^3$ are each independently methyl, methoxy, or ethoxy, with the proviso that at least one of the $R^1$, $R^2$ and $R^3$ radicals is a methoxy or ethoxy radical,
X is a propylene radical ($-CH_2-CH_2-CH_2-$), and
R4 is hydrogen,
with
alkyl formates of the general formula (V) in which
$R^9$ is hydrogen and
$R^{10}$ is a saturated aliphatic organic radical having 1 to 4 carbon atoms.

Particularly preferred aminosilanes of the general formula (IV) are reaction products of 3-aminopropyltrimethoxysilane and/or 3-aminopropyltriethoxysilane with methyl formate and/or ethyl formate.

Suitable silane compounds B), finally, are also any mercaptosilanes of the general formula (VI)

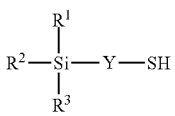

(VI)

in which IV, $R^2$ and $R^3$ have the definition given for formula (I) and
Y is a linear or branched organic radical having at least 2 carbon atoms.

Examples of suitable mercaptosilanes B) are 2-mercaptoethyltrimethylsilane, 2-mercaptoethylmethyldimethoxysilane, 2-mercaptoethyltrimethoxysilane, 2-mercaptoethyltriethoxysilane, 3-mercaptopropylmethyldimethoxysilane, 3-mercaptopropyldimethylmethoxysilane, 3-mercaptopropyltrimethoxysilane, 3-mercaptopropylmethyldiethoxysilane, 3-mercaptopropyltriethoxysilane, 3-mercaptopropylethyldimethoxysilane, 3-mercaptopropylethyldiethoxysilane and/or 4-mercaptobutyltrimethoxysilane.

Preferred mercaptosilanes B) for the process of the invention are those of the general formula (VI) in which
$R^1$, $R^2$ and $R^3$ are identical or different radicals and are each a saturated, linear or branched, aliphatic or cycloaliphatic radical having up to 6 carbon atoms, and may optionally contain up to 3 oxygen atoms, and
Y is a linear or branched alkylene radical having 2 to 10 carbon atoms.

Particularly preferred mercaptosilanes B) are those of the general formula (VI) in which
$R^1$, $R^2$ and $R^3$ are each alkyl radicals having up to 6 carbon atoms and/or alkoxy radicals which contain up to 3 oxygen atoms, with the proviso that at least one of the radicals $R^1$, $R^2$ and $R^3$ is an alkoxy radical of this kind, and
Y is a propylene radical ($-CH_2-CH_2-CH_2-$).

Especially preferred mercaptosilanes B) are those of the general formula (VI) in which
$R^1$, $R^2$ and $R^3$ are identical or different radicals and are each methyl, methoxy or ethoxy, with the proviso that at least one of the radicals $R^1$, $R^2$ and $R^3$ is a methoxy or ethoxy radical, and X is a propylene radical (—$CH_2$—$CH_2$—$CH_2$—),
especially 3-mercaptopropyltrimethoxysilane and/or 3-mercaptopropyltriethoxysilane.

For preparation of the modified polyisocyanates of the invention, the starting polyisocyanates A) are reacted with the silane-functional compounds B) at temperatures of 20 to 200° C., preferably 30 to 160° C., more preferably at 35 to 120° C.

The preparation is preferably effected with observation of an equivalents ratio of isocyanate groups to groups reactive toward isocyanates of 50:1 to 1.05:1, preferably of 20:1 to 1.25:1, more preferably of 10:1 to 1.5:1.

The conversion of the starting components A) and B) can be conducted without the use of catalysts. Especially in the case of use of mercaptosilanes B), however, it may be advantageous also to use suitable catalysts to accelerate the conversion. Suitable catalysts are especially the standard catalysts known from polyurethane chemistry, examples of which include tertiary amines, for example triethylamine, tributylamine, dimethylbenzylamine, diethylbenzylamine, pyridine, methylpyridine, dicyclohexylmethylamine, dimethylcyclohexylamine, N,N,N',N'-tetramethyldiaminodiethyl ether, bis(dimethylaminopropyl)urea, N-methylmorpholine, N-ethylmorpholine, N-cocomorpholine, N-cyclohexylmorpholine, N,N,N',N'-tetramethylethylenediamine, N,N,N',N'-tetramethyl-1,3-butanediamine, N,N,N',N'-tetramethyl-1,6-hexanediamine, pentamethyldiethylenetriamine, N-methylpiperidine, N-dimethylaminoethylpiperidine, N,N'-dimethylpiperazine, N-methyl-N'-dimethylaminopiperazine, 1,2-dimethylimidazole, 2-methylimidazole, N,N-dimethylimidazole-β-phenylethylamine, 1,4-diazabicyclo[2.2.2]octane (DABCO) and bis(N,N-dimethylaminoethyl) adipate, amidines, for example 1,5-diazabicyclo[4.3.0]nonene (DBN), 1,8-diazabicyclo[5.4.0]undecene-7 (DBU) and 2,3-dimethyl-3,4,5,6-tetrahydropyrimidine, alkanolamine compounds, for example triethanolamine, triisopropanolamine, N-methyl- and N-ethyldiethanolamine, dimethylaminoethanol and 2-(N,N-dimethylaminoethoxy)ethanol, N,N',N''-tris(dialkylaminoalkyl)hexahydrotriazines, for example N,N',N''-tris(dimethylaminopropyl)-s-hexahydrotriazine, bis(dimethylaminoethyl) ether, and metal salts, for example inorganic and/or organic compounds of iron, lead, bismuth, zinc and/or tin in customary oxidation states of the metal, for example iron(II) chloride, iron(III) chloride, bismuth(III) bismuth(III) 2-ethylhexanoate, bismuth(III) octoate, bismuth(III) neodecanoate, zinc chloride, zinc 2-ethylcaproate, tin(II) octoate, tin(II) ethylcaproate, tin(II) palmitate, dibutyltin(IV) dilaurate (DBTL), dibutyltin(IV) dichloride or lead octoate.

Catalysts to be used with preference are tertiary amines, amidines and tin compounds of the type mentioned.

Particularly preferred catalysts are 1,4-diazabicyclo[2.2.2]octane (DABCO), 1,5-diazabicyclo[4.3.0]nonene (DBN), 1,8-diazabicyclo[5.4.0]undecene-7 (DBU) and dibutyltin(IV) dilaurate (DBTL).

The catalysts mentioned by way of example can be used in the preparation of the inventive polyisocyanates containing silane groups individually or in the form of any desired mixtures with one another and, if used at all, are used in amounts of 0.001% to 1.0% by weight, preferably 0.01% to 0.5% by weight, calculated as the total amount of catalysts employed based on the total amount of the starting compounds used.

According to the invention, the preparation can be conducted in a solvent-free manner. If desired, however, suitable solvents inert toward the reactive groups of the starting components can also be used. Examples of suitable solvents are the customary paint solvents which are known such as, for example, ethyl acetate, butyl acetate, ethylene glycol monomethyl or monoethyl ether acetate, 1-methoxy-2-propyl acetate (MPA), 3-methoxy-n-butyl acetate, acetone, 2-butanone, 4-methyl-2-pentanone, cyclohexanone, toluene, xylene, chlorobenzene, white spirit, relatively highly substituted aromatics, of the kind commercialized, for example, under the names solvent naphtha, SOLVESSO, ISOPAR, NAPPAR (Deutsche EXXON CHEMICAL GmbH, Cologne, Del.) and SHELLSOL (Deutsche Shell Chemie GmbH, Eschborn, Del.), but also solvents such as propylene glycol diacetate, diethylene glycol dimethyl ether, dipropylene glycol dimethyl ether, diethylene glycol ethyl and butyl ether acetate, N-methylpyrrolidone and N-methylcaprolactam, or any desired mixtures of such solvents.

The progress of the reaction can be monitored by determining the NCO content by titrimetric means, for example.

Irrespective of the type and amount of the starting compounds A) and B) used, the products obtained are clear, virtually colorless polyisocyanates containing silane groups, generally having color numbers below 120 APHA, preferably below 80 APHA, more preferably below 60 APHA, and an NCO content of 1.3% to 24.9% by weight, preferably 4.0% to 23.5% by weight, more preferably 5.0% to 21.0% by weight, and a mean NCO functionality of 1.0 to 4.9, preferably of 1.8 to 4.8, more preferably of 2.0 to 4.0.

The inventive polyisocyanates containing silane groups are valuable starting materials for the production of polyurethane plastics and/or polyurea plastics by the isocyanate polyaddition process.

At the same time, they can be used without solvent, but as and when required may also be converted to a haze-free dilution form using customary solvents, examples being the aforementioned inert paint solvents for optional accompanying use in the process of the invention.

The preferred embodiments and parameters cited also apply analogously to the process of the invention for preparation of the modified polyisocyanates.

The invention likewise provides for the use of the modified polyisocyanates of the invention as starting component in the production of polyurethane plastics.

The invention further provides for the use of polyisocyanate mixtures comprising modified polyisocyanates of the invention and polyisocyanates which have uretdione, isocyanurate, iminooxadiazinedione, urethane, allophanate, biuret and/or oxadiazinetrione structure and bear aliphatically, cycloaliphatically, araliphatically and/or aromatically bonded isocyanate groups as starting component in the production of polyurethane plastics.

The inventive polyisocyanates containing silane groups are outstandingly suitable as crosslinker components or constituents of crosslinker components for two-component polyurethane coating materials, in which polyhydroxyl compounds present are the customary polyether polyols, polyester polyols, polycarbonate polyols and/or polyacrylate polyols, as co-reactants for the polyisocyanates. Particularly preferred co-reactants for the process products of the invention are polyacrylates containing hydroxyl groups, i.e., polymers and/or copolymers of (meth)acrylic acid alkyl esters, optionally with styrene or other copolymerizable olefinically unsaturated monomers.

In general the coating compositions formulated with the inventive polyisocyanates containing silane groups, into which compositions, optionally, the auxiliaries and additives customary in the coatings sector may be incorporated, examples being flow control assistants, color pigments, fillers or matting agents, have technical coatings properties that are good even in the case of room-temperature drying. Of course, they may alternatively be dried under forced conditions at elevated temperature or by baking at temperatures up to 260° C.

In order to control the rate of cure, it is possible when formulating the coating compositions to include suitable catalysts, examples being the catalysts customary in isocyanate chemistry, such as, for example, tertiary amines such as triethylamine, pyridine, methylpyridine, benzyldimethylamine, N,N-endoethylenepiperazine, N-methylpiperidine, pentamethyldiethylenetriamine, N,N-dimethylaminocyclohexane, N,N'-dimethylpiperazine or metal salts such as iron(III) chloride, zinc chloride, zinc 2-ethylcaproate, tin(II) octanoate, tin(II) ethylcaproate, dibutyltin(IV) dilaurate, bismuth(III) 2-ethylhexanoate, bismuth(III) octoate, or molybdenum glycolate. In addition it is also possible to use catalysts which accelerate the hydrolysis and condensation of alkoxysilane groups or their reaction with the hydroxyl groups of the polyol components used as binders. Catalysts of this kind, as well as the aforementioned isocyanate catalysts, are also, for example, acids, such as p-toluenesulfonic acid, trifluoromethanesulfonic acid, acetic acid, trifluoroacetic acid and dibutyl phosphate, bases, such as N-substituted amidines such as 1,5-diazabicyclo[4.3.0]non-5-ene (DBN) and 1,5-diazabicyclo[5.4.0]undec-7-ene (DBU), but also metal salts or organometallic compounds, such as tetraisopropyl titanate, tetrabutyl titanate, titanium (IV) acetylacetonate, aluminium acetylacetonate, aluminium triflate or tin triflate, for example.

The inventive polyisocyanates containing silane groups can of course also be used in a form in which they are blocked with blocking agents known—from polyurethane chemistry, in combination with the aforementioned paint binders or paint binder components, as one-component PU baking systems. Examples of suitable blocking agents are diethyl malonate, ethyl acetoacetate, activated cyclic ketones, such as cyclopentanone-2-carboxymethyl ester and -carboxyethyl ester, for example, acetone oxime, butanone oxime, ε-caprolactam, 3,5-dimethylpyrazole, 1,2,4-triazole, dimethyl-1,2,4-triazole, imidazole, benzyl-tert-butylamine, or any desired mixtures of these blocking agents.

The process products of the invention can also be combined with polyamines, such as the polyaspartic acid derivatives known from EP-B 0 403 921, or else with polyamines whose amino groups are in blocked form, such as polyketimines, polyaldimines or oxazolanes, for example. The effect of moisture on these blocked amino groups is to turn them into free amino groups and, in the case of the oxazolanes, into free hydroxyl groups as well, which are consumed by reaction with the isocyanate groups of the thioallophanate polyisocyanates containing silane groups, a reaction accompanied by crosslinking.

The inventive polyisocyanates containing silane groups are also suitable as crosslinker components for binders or binder components which are present in aqueous solution or dispersion and have groups that are reactive toward isocyanate groups, more particularly alcoholic hydroxyl groups, in the production of aqueous two-component polyurethane systems. In this case, on the basis of their low viscosity, they can be used either as such, i.e., in hydrophobic form, or else in a form in which they have been given hydrophilic modification by known methods, as for example, in accordance with EP-B 0 540 985, EP-B 0 959 087 or EP-B 1 287 052.

The coating systems formulated with the inventive polyisocyanates containing silane groups may optionally also be admixed with any desired further hydrolyzable silane compounds, such as, for example, tetramethoxysilane, tetraethoxysilane, methyltrimethoxysilane, methyltriethoxysilane, ethyltriethoxysilane, isobutyltrimethoxysilane, isobutyltriethoxysilane, octyltriethoxysilane, octyltrimethoxysilane, (3-glycidyloxypropyl)methyldiethoxysilane, (3-glycidyloxypropyl)trimethoxysilane, phenyltrimethoxysilane or phenyltriethoxysilane, or mixtures of such silane compounds, as co-reactants.

In all the uses described above for the inventive polyisocyanates, they may be employed both alone and in blends with any desired further polyisocyanates having aliphatically, cycloaliphatically, araliphatically and/or aromatically bonded isocyanate groups, more particularly with the known paint polyisocyanates having uretdione, isocyanurate, iminooxadiazinedione, urethane, allophanate, biuret and/or oxadiazinetrione structure, as described by way of example in Laas et al., *J. Prakt. Chem.* 336, 1994, 185-200, in DE-A 1 670 666, DE-A 3 700 209, DE-A 3 900 053, EP-A 0 330 966, EP-A 0 336 205, EP-A 0 339 396, and EP-A 0 798 299, as isocyanate component.

The invention accordingly also provides for the use of the inventive PDI polyisocyanates containing silane groups for blending with polyisocyanates having aliphatically, cycloaliphatically, araliphatically and/or aromatically bonded isocyanate groups which have uretdione, isocyanurate, iminooxadiazinedione, urethane, allophanate, biuret and/or oxadiazinetrione structure, and also the polyisocyanate mixtures resulting therefrom and containing silane groups, themselves.

In two-component polyurethane and/or polyurea paints and coatings which comprise the inventive polyisocyanates containing silane groups as crosslinker components or constituents of crosslinker components for polyols and/or polyamines, the co-reactants are customarily present in amounts such that for every optionally blocked isocyanate group there are 0.5 to 3, preferably 0.6 to 2.0, more preferably 0.8 to 1.6 optionally blocked, isocyanate-reactive groups.

The polyisocyanate mixtures of the invention may optionally be admixed in minor amounts, however, with nonfunctional paint binders, for the purpose of achieving very specific properties, as an additive for improving adhesion, for example.

Substrates contemplated for the coatings formulated using the inventive polyisocyanates containing silane groups include any desired substrates, such as, for example, metal, wood, glass, stone, ceramic materials, concrete, rigid and flexible plastics, textiles, leather, and paper, which prior to coating may optionally also be provided with customary primers.

This invention thus further provides coating compositions comprising the modified polyisocyanates of the invention, and also the substrates coated with these coating compositions.

The invention likewise provides coating compositions comprising polyisocyanate mixtures comprising modified polyisocyanates of the invention and polyisocyanates having uretdione, isocyanurate, iminooxadiazinedione, urethane, allophanate, biuret and/or oxadiazinetrione structure, which bear aliphatically, cycloaliphatically, araliphatically and/or aromatically bonded isocyanate groups, and the substrates coated with these coating compositions.

The inventive PDI polyisocyanates containing silane groups, by comparison with state of the art polyisocyanates based on HDI that are of analogous structure, give coatings which, after mechanical stress, have higher residual gloss, i.e. a lower tendency to scratching.

Furthermore, the paint films produced with the inventive PDI polyisocyanate mixtures containing silane groups, given the same NCO functionality and the same proportion of silane groups, in some cases also have a distinct improvement in solvent and chemical stability over silane-modified HDI polyisocyanates.

EXAMPLES

All reported percentages are based on weight unless otherwise stated.

The NCO contents were determined by titrimetry per DIN EN ISO 11909.

The residual monomer contents were measured to DIN EN ISO 10283 by gas chromatography with an internal standard.

All the viscosity measurements were made with a Physica MCR 51 rheometer from Anton Paar Germany GmbH (Germany) to DIN EN ISO 3219.

The contents (mol %) of the uretdione, isocyanurate, allophanate, iminooxadiazinedione and/or biuret structures present in the starting polyisocyanates were calculated from the integrals of proton-decoupled $^{13}C$ NMR spectra (recorded on a Bruker DPX-400 instrument) and are each based on the sum total of uretdione, isocyanurate, allophanate, iminooxadiazinedione and/or biuret structures present. In the case of PDI polyisocyanates and HDI polyisocyanates, the individual structural elements have the following chemical shifts (in ppm): uretdione: 157.1; isocyanurate: 148.4; allophanate: 155.7 and 153.8, biuret: 155.5; iminooxadiazinedione: 147.8, 144.3 and 135.3. The Hazen color number was measured by spectrophotometry according to DIN EN 1557 with a LICO 400 spectrophotometer from Lange, Germany.

Polyisocyanates A)

Polyisocyanate A1)

An initial charge of 1000 g (6.49 mol) of pentamethylene 1,5-diisocyanate (PDI) in a four-neck flask equipped with stirrer, reflux condenser, $N_2$ passage tube and internal thermometer was degassed three times at room temperature by applying a vacuum of about 50 mbar and venting with nitrogen. Subsequently, the mixture was heated to 60° C. and the catalyst solution (1.5% N,N,N-trimethyl-N-benzylammonium hydroxide solution in a 1:1 mixture of methanol and 2-ethyl-1-hexanol) was metered in at such a rate that the temperature of the reaction mixture, in spite of the onset of the exothermic trimerization reaction, increased to a maximum of 80° C. On attainment of an NCO content of 47.8% by weight, dibutyl phosphate (equimolar amount based on trimethylbenzylammonium hydroxide used) was used to stop the reaction, and the unconverted monomeric PDI was removed at a temperature of 140° C. and a pressure of 0.5 mbar on a thin-film evaporator. A virtually colorless polyisocyanurate polyisocyanate was obtained, having the following indices:
NCO content: 24.2%
NCO functionality (calc.): about 3.3
Viscosity (23° C.): 2200 mPas
Monomeric PDI: 0.06%
Color number (APHA): 30 Hazen
Distribution of the Oligomeric Structure Types:
Isocyanurate: 78 mol %
Iminooxadiazinedione 3 mol %
Uretdione 3 mol %
Allophanate: 16 mol %
Starting Polyisocyanate A2)

By the method described for starting polyisocyanate A1) and using the catalyst solution described therein, 1000 g (6.49 mol) of PDI were converted down to an NCO content of 36.7%. After the catalyst had been deactivated and then the unconverted monomeric PDI had been removed by distillation with the aid of a thin-film evaporator at 140° C. and 0.5 mbar, a virtually colorless polyisocyanurate polyisocyanate was obtained, having the following indices:
NCO content: 21.7%
NCO functionality (calc.): about 3.5
Viscosity (23° C.): 9850 mPas
Monomeric PDI: 0.05%
Color number (APHA): 34 Hazen
Distribution of the Oligomeric Structure Types:
Isocyanurate: 84 mol %
Iminooxadiazinedione 3 mol %
Uretdione 3 mol %
Allophanate: 10 mol %
Starting Polyisocyanate A3)

Based on the process of EP-A 0 150 769, 1016 g (6.6 mol) of PDI were reacted with 1.0 mol of water in the presence of 0.05 mol of pivalic anhydride at a temperature of 125° C. On attainment of an NCO content of 42.7%, unconverted PDI was removed together with pivalic anhydride by thin-film distillation at a temperature of 130° C. and a pressure of 0.2 mbar. A virtually colorless biuret polyisocyanate was obtained, having the following indices:
NCO content: 24.2%
NCO functionality: about 3.2
Viscosity (23° C.): 8000 mPas
Monomeric PDI: 0.2%
Color number (APHA): 26 Hazen
Distribution of the Oligomeric Structure Types:
Biuret: 89.3 mol %
Uretdione 10.7 mol %

Example 1

(Inventive, Silane-Modified PDI Polyisocyanate)

To an initial charge of 620 g (3.2 eq) of the starting polyisocyanate A2) dissolved in 385 g of butyl acetate at 30° C. under dry nitrogen were added 282 g (1.2 eq) of N-(n-butyl)-3-aminopropyltrimethoxysilane while stirring within 90 min in such a way that the temperature of the reaction mixture did not exceed 50° C. After the addition had ended, the mixture was stirred for a further 30 min. After cooling to room temperature, there was a colorless clear polyisocyanate mixture having the following indices:
NCO content: 4.4%
NCO functionality: 2.2
Solids content: 70%
Viscosity (23° C.): 99 mPas
Color number (APHA): 24 Hazen

Example 2

(Comparative, Silane-Modified HDI Polyisocyanate)

To an initial charge of 620 g (3.2 eq) of an HDI-based polyisocyanate containing isocyanurate groups (distribution of the oligomeric structure types: isocyanurate: 88 mol %, iminooxadiazinedione: 5 mol %, uretdione: 3 mol %, allophanate: 4 mol %) having an NCO content of 21.7%, a mean NCO functionality of 3.5 (by GPC), a monomeric HDI content of 0.1% and a viscosity of 3000 mPas (23° C.), dissolved in 385 g of butyl acetate at 30° C. under dry nitrogen, were added 282 g (1.2 eq) of N-(n-butyl)-3- aminopropyltrimethoxysilane while stirring within 90 min in such a way that the temperature of the reaction mixture did not exceed 50° C. After the addition had ended, the mixture was stirred for a further 30 min. After cooling to room temperature, there was a colorless clear polyisocyanate mixture having the following indices:
NCO content: 4.4%
NCO functionality: 2.2
Solids content: 70%
Viscosity (23° C.): 85 mPas
Color number: 26 APHA Example 3

(Inventive, Silane-Modified PDI Polyisocyanate)
To an initial charge of 620 g (3.2 eq) of the starting polyisocyanate A2) dissolved in 800 g of butyl acetate at 30° C. under dry nitrogen were added a mixture of 235 g (1.0 eq) of N-(n-butyl)-3-aminopropyltrimethoxysilane and 341 g (1.0 eq) of bis(3-trimethoxysilylpropyl)amine while stirring within 90 min in such a way that the temperature of the reaction mixture did not exceed 50° C. After the addition had ended, the mixture was stirred for a further 30 min. After cooling to room temperature, there was a colorless clear polyisocyanate mixture having the following indices:
NCO content: 2.5%
NCO functionality: 1.3
Solids content: 60%
Viscosity (23° C.): 80 mPas
Color number: 22 APHA Example 4

(Inventive, Silane-Modified PDI Polyisocyanate)
To an initial charge of 620 g (3.2 eq) of the starting polyisocyanate A2) dissolved in 225 g of butyl acetate at 30° C. under dry nitrogen were added 275 g (0.8 eq) of bis(3-trimethoxysilylpropyl)amine while stirring within 90 min in such a way that the temperature of the reaction mixture did not exceed 50° C. After the addition had ended, the mixture was stirred for a further 30 min. After cooling to room temperature, there was a colorless clear polyisocyanate mixture having the following indices:
NCO content: 9.0%
NCO functionality: 2.6
Solids content: 80%
Viscosity (23° C.): 860 mPas
Color number: 27 APHA Example 5

(Inventive, Silane-Modified PDI Polyisocyanate)
To an initial charge of 700 g (4.0 eq) of the starting polyisocyanate A1) dissolved in 280 g of butyl acetate at 30° C. under dry nitrogen were added 421 g (1.2 eq) of an adduct of aminopropyltrimethoxysilane onto diethyl maleate prepared according to Example 5 of EP-A 0 596 360 while stirring within 90 min in such a way that the temperature of the reaction mixture did not exceed 50° C. After the addition had ended, the mixture was stirred for a further 30 min. After cooling to room temperature, there was a colorless clear polyisocyanate mixture having the following indices:
NCO content: 8.4%
NCO functionality: 2.3
Solids content: 80%
Viscosity (23° C.): 1080 mPas
Color number: 32 APHA Example 6

(Comparative, Silane-Modified HDI Polyisocyanate)
To an initial charge of 700 g (3.8 eq) of an HDI-based polyisocyanate containing isocyanurate groups (distribution of the oligomeric structure types: isocyanurate: 89 mol %, iminooxadiazinedione: 3 mol %, uretdione: 3 mol %, allophanate: 5 mol %) having an NCO content of 23.0%, a mean NCO functionality of 3.3 (by GPC), a monomeric HDI content of 0.1% and a viscosity of 1200 mPas (23° C.), dissolved in 280 g of butyl acetate at 30° C. under dry nitrogen, were added 421 g (1.2 eq) of an adduct of aminopropyltrimethoxysilane onto diethyl maleate prepared according to Example 5 of EP-A 0 596 360 while stirring within 90 min in such a way that the temperature of the reaction mixture did not exceed 50° C. After the addition had ended, the mixture was stirred for a further 30 min. After cooling to room temperature, there was a colorless clear polyisocyanate mixture having the following indices:
NCO content: 7.8%
NCO functionality: 2.3
Solids content: 80%
Viscosity (23° C.): 570 mPas
Color number: 44 APHA Example 7

(Inventive, Silane-Modified PDI Polyisocyanate)
To an initial charge of 620 g (3.2 eq) of the starting polyisocyanate A2) dissolved in 390 g of butyl acetate at 60° C. under dry nitrogen were added 294 g (1.5 eq) of mercaptopropyltrimethoxysilane and, after addition of 0.02 g (20 ppm) of 1,4-diazabicyclo[2.2.2]octane (DABCO), the mixture was stirred for one hour until an NCO content of 5.5%, corresponding to full conversion, had been attained. After cooling to room temperature, there was a colorless clear polyisocyanate mixture having the following indices:
NCO content: 5.5%
NCO functionality: 1.9
Solids content: 70%
Viscosity (23° C.): 53 mPas
Color number: 20 APHA Example 8

(Comparative, Silane-Modified HDI Polyisocyanate)
To an initial charge of 620 g (3.2 eq) of the HDI-based polyisocyanate containing isocyanurate groups as described in the preparation of comparative polyisocyanate A2), dissolved in 390 g of butyl acetate at 60° C. under dry nitrogen were added 294 g (1.5 eq) of mercaptopropyltrimethoxysilane and, after addition of 0.02 g (20 ppm) of DABCO, the mixture was stirred for one hour until an NCO content of 5.5%, corresponding to full conversion, had been attained. After cooling to room temperature, there was a colorless clear polyisocyanate mixture having the following indices:
NCO content: 5.5%
NCO functionality: 1.9
Solids content: 70%
Viscosity (23° C.): 56 mPas
Color number: 26 APHA Example 9

(Inventive, Silane-Modified PDI Polyisocyanate)
To an initial charge of 620 g (3.2 eq) of the starting polyisocyanate A2) dissolved in 560 g of butyl acetate at 60° C. under dry nitrogen were added a mixture of 160 g (0.8 eq)

of mercaptopropyltrimethoxysilane and 270 g (0.8 eq) of bis(3-trimethoxysilylpropyl)amine, and the mixture was stirred for one hour until an NCO content of 4.2%, corresponding to full conversion, had been attained. After cooling to room temperature, there was a colorless clear polyisocyanate mixture having the following indices:
NCO content: 4.2%
NCO functionality: 1.8
Solids content: 65%
Viscosity (23° C.): 63 mPas
Color number: 24 APHA Example 10

(Comparative, Silane-Modified HDI Polyisocyanate)

To an initial charge of 620 g (3.2 eq) of the HDI-based polyisocyanate containing isocyanurate groups as described in the preparation of comparative polyisocyanate A2), dissolved in 560 g of butyl acetate at 60° C. under dry nitrogen were added a mixture of 160 g (0.8 eq) of mercaptopropyltrimethoxysilane and 270 g (0.8 eq) of bis(3-trimethoxysilylpropyl)amine, and the mixture was stirred for one hour until an NCO content of 4.2%, corresponding to full conversion, had been attained. After cooling to room temperature, there was a colorless clear polyisocyanate mixture having the following indices:
NCO content: 4.2%
NCO functionality: 1.8
Solids content: 65%
Viscosity (23° C.): 55 mPas
Color number: 28 APHA Example 11

(Inventive, Silane-Modified PDI Polyisocyanate)

To an initial charge of 700 g (4.0 eq) of the starting polyisocyanate A1) dissolved in 90 g of butyl acetate at 60° C. under dry nitrogen were added 100 g (0.5 eq) of mercaptopropyltrimethoxysilane and, after addition of 0.02 g (20 ppm) of 1,4-diazabicyclo[2.2.2]octane (DABCO), the mixture was stirred for one hour until an NCO content of 5.5%, corresponding to full conversion, had been attained. After cooling to room temperature, there was a colorless clear polyisocyanate mixture having the following indices:
NCO content: 16.5%
NCO functionality: 2.9
Solids content: 90%
Viscosity (23° C.): 2050 mPas
Color number: 28 APHA Example 12

(Inventive, Silane-Modified PDI Polyisocyanate)

To an initial charge of 700 g (4.0 eq) of the starting polyisocyanate A1) at 60° C. under dry nitrogen were added 40 g (0.2 eq) of mercaptopropyltrimethoxysilane and, after addition of 0.02 g (30 ppm) of 1,4-diazabicyclo[2.2.2]octane (DABCO), the mixture was stirred for one hour until an NCO content of 5.5%, corresponding to full conversion, had been attained. After cooling to room temperature, there was a colorless clear polyisocyanate mixture having the following indices:
NCO content: 21.6%
NCO functionality: 3.1
Solids content: 100%
Viscosity (23° C.): 2680 mPas
Color number: 34 APHA Example 13

(Inventive, Silane-Modified PDI Polyisocyanate)

To an initial charge of 520 g (3.2 eq) of the starting polyisocyanate A3) dissolved in 196 g of butyl acetate at 60° C. under dry nitrogen were added 265 g (1.35 eq) of mercaptopropyltrimethoxysilane and, after addition of 0.02 g (20 ppm) of 1,4-diazabicyclo[2.2.2]octane (DABCO), the mixture was stirred for one hour until an NCO content of 7.1%, corresponding to full conversion, had been attained. After cooling to room temperature, there was a colorless clear polyisocyanate mixture having the following indices:
NCO content: 7.1%
NCO functionality: 1.8
Solids content: 80%
Viscosity (23° C.): 610 mPas
Color number: 22 APHA Example 14

(Comparative, Silane-Modified HDI Polyisocyanate)

To an initial charge of 650 g (3.4 eq) of HDI-based polyisocyanate containing biuret groups (distribution of oligomeric structure types: biuret: 88.7 mol %, uretdione: 11.3 mol %) having an NCO content of 21.9%, a mean NCO functionality of 3.6 (by GPC), a monomeric HDI content of 0.1% and a viscosity of 9700 mPas (23° C.), dissolved in 236 g of butyl acetate at 60° C. under dry nitrogen were added 294 g (1.5 eq) of mercaptopropyltrimethoxysilane and, after addition of 0.02 g (20 ppm) of DABCO, the mixture was stirred for one hour until an NCO content of 6.7%, corresponding to full conversion, had been attained. After cooling to room temperature, there was a colorless clear polyisocyanate mixture having the following indices:
NCO content: 6.7%
NCO functionality: 2.0
Solids content: 80%
Viscosity (23° C.): 920 mPas
Color number: 28 APHA Example 15 (Use)

100 parts by weight of a commercial polyacrylate polyol, in a 65% solution in butyl acetate/xylene (3:1) with an OH number of 3.0 mg KOH/g based on supply form (SETALUX A 665 BA/X, Nuplex GmbH, Bitterfeld, Germany) were mixed with 6.5 parts by weight of a 10% solution of a commercial levelling agent (BYK 331, BYK-Chemie GmbH, Wesel, Germany) in 1-methoxypropyl-2-acetate (MPA), 22.2 parts by weight of a 10% solution of tetra-n-butylammonium benzoate in MPA as catalyst and 32.7 parts by weight of butyl acetate as solvent. To this mixture were added 169.0 parts by weight of the inventive polyisocyanate from Example 1 (corresponding to an equivalents ratio of isocyanate groups to alcoholic hydroxyl groups of 1:1), and the mixture was homogenized by stirring at 1000 rpm for five minutes.

Correspondingly, by the same method, 100 parts by weight each of SETALUX A 665 BA/X and the inventive polyisocyanates or comparative polyisocyanates according to Examples 2 and 7 to 12 (corresponding in each case to an equivalents ratio of isocyanate groups to alcoholic hydroxyl groups of 1:1) were used to produce clearcoats.

The clearcoat formulations thus obtained, which had comparable pot lives of about 2 hours, were each applied with the aid of an airless spraying system in a wet film thickness of about 60 μm to a glass plate and to a sheet of metal precoated with a black basecoat. After a short flashoff time, the films were dried in a drying cabinet at 140° C. for 30 min, then stored at 60° C. for 16 h.

The table which follows shows paint-related properties of the coatings obtained. König pendulum hardness was determined according to DIN 53157.

molecules and having uretdione, isocyanurate, allophanate, biuret, iminooxadiazinedione and/or oxadiazinetrione structure or any desired mixtures of such polyisocyanates.

| Polyisocyanate from | Example 1 | Example 2 (comparative) | Example 5 | Example 6 (comparative) | Example 7 | Example 8 (comparative) | Example 9 | Example 10 (comparative) |
|---|---|---|---|---|---|---|---|---|
| Polyisocyanate [pts. by wt.] [a] | 169.0 | 169.0 | 88.4 | 95.2 | 135.0 | 135.0 | 176.8 | 176.8 |
| König pendulum hardness [s] | 189 | 187 | 191 | 189 | 195 | 185 | 198 | 189 |
| Solvent resistance [b], [c] | | | | | | | | |
| Xylene (5 min) | 0 | 0 | 0 | 0 | 0 | 0 | 0 | 0 |
| MPA (5 min) | 0 | 0 | 0 | 0 | 0 | 0 | 0 | 0 |
| Ethyl acetate (5 min) | 0 | 0 | 0 | 0 | 0 | 0 | 0 | 0 |
| Acetone (5 min) | 1 | 1 | 1 | 3 | 1 | 1 | 0 | 1 |
| Chemical resistance [b], [d] | | | | | | | | |
| Tree resin | >68/>68 | 52/52 | 60/60 | 50/50 | >68/>68 | >68/>68 | >68/>68 | >68/>68 |
| Pancreatin (1% in water) | 42/42 | 36/36 | 36/36 | 36/36 | 44/44 | 36/42 | 36/36 | 36/36 |
| Water, deionized | >68/>68 | >68/>68 | >68/>68 | >68/>68 | >68/>68 | >68/>68 | >68/>68 | >68/>68 |
| Sodium hydroxide (1% in water) | 66/66 | 64/64 | 52/52 | 49/49 | 59/59 | 50/50 | 57/57 | 55/55 |
| Sulfuric acid (1% in water) | 41/41 | 41/41 | 36/36 | 36/36 | 41/41 | 36/36 | 40/40 | 36/36 |
| Haze [e] | 15.4 | 17.5 | 10.6 | 23.6 | 11.2 | 12.8 | 12.7 | 15.7 |
| Scratch resistance [e], [f] | | | | | | | | |
| Starting gloss | 86 | 86 | 87 | 85 | 89 | 88 | 87 | 88 |
| Gloss after scratching | 56 | 51 | 29 | 28 | 43 | 42 | 72 | 72 |
| Relative residual gloss | 65.1% | 59.3% | 33.3% | 32.9% | 48.3% | 47.7% | 82.8% | 81.8% |
| Gloss after reflow | 80 | 77 | 68 | 52 | 81 | 77 | 85 | 83 |
| Relative residual gloss | 93.0% | 89.5% | 78.2% | 61.2% | 91.0% | 87.5% | 97.7% | 94.3% |

| Polyisocyanate from | Example 13 | Example 14 (comparative) |
|---|---|---|
| Polyisocyanate [pts. by wt.] [a] | 104.6 | 110.8 |
| König pendulum hardness [s] | 196 | 198 |
| Solvent resistance [b], [c] | | |
| Xylene (5 min) | 0 | 0 |
| MPA (5 min) | 0 | 0 |
| Ethyl acetate (5 min) | 0 | 0 |
| Acetone (5 min) | 1 | 1 |
| Chemical resistance [b], [d] | | |
| Tree resin | 66/68 | 62/64 |
| Pancreatin (1% in water) | 36/36 | 36/36 |
| Water, deionized | >68/>68 | >68/>68 |
| Sodium hydroxide (1% in water) | 67/67 | 60/60 |
| Sulfuric acid (1% in water) | 41/41 | 39/39 |
| Haze [e] | 10.5 | 10.4 |
| Scratch resistance [e], [f] | | |
| Starting gloss | 89 | 88 |
| Gloss after scratching | 48 | 38 |
| Relative residual gloss | 53.9% | 43.2% |
| Gloss after reflow | 79 | 66 |
| Relative residual gloss | 88.8% | 75.0% |

[a] based on 100 parts by weight of SETALUX A 665 BA/X used
[b] measured on clearcoats on glass plate
[c] assessment: 0-5 (0 = paint film unchanged; 5 = fully dissolved)
[d] measured in gradient oven, figure in ° C. after contact time of 1 h/24 h
[e] measured on clearcoats on a sheet of metal precoated with a black basecoat
[f] Hammer test with steel wool (dry scratching):
A hammer (weight: 800 g without shaft) covered with 00 steel wool on its flat side was cautiously placed onto the coated surface at right angles and guided over the coating in a trace without tipping and without additional physical force. 50 twin strokes were conducted in each case. After the exposure to the scratching medium, the test area was cleaned with a soft cloth and then the gloss (20° angle) was measured transverse to the direction of scratching according to DIN EN ISO 2813. The figures for dry scratching are in degrees of gloss and in % residual gloss, measured immediately after scratching and after "reflow" conditions, i.e. storage at 60° C. for two hours, in each case in absolute terms and relative to the starting gloss of the coating.

Various aspects of the subject matter described herein are set out in the following numbered clauses:

1. A modified polyisocyanate obtainable by reacting at least one polyisocyanate A) based on 1,5-diisocyanatopentane with at least one silane compound B) reactive toward isocyanate groups.

2. The modified polyisocyanate as in clause 1, characterized in that the polyisocyanate A) is an oligomeric polyisocyanate consisting of at least two 1,5-diisocyanatopentane 3. The modified polyisocyanate as in either of clauses 1 and 2, characterized in that the polyisocyanates A) are oligomeric polyisocyanates consisting of at least two 1,5-diisocyanatopentane molecules and having a) a mean isocyanate functionality of 2.0 to 5.0 and b) an isocyanate group content of 11.0% to 26.0% by weight.

4. The modified polyisocyanate as in any of clauses 1 to 3, characterized in that the silane compounds B) reactive toward isocyanate groups are aminosilanes of the general formula (I)

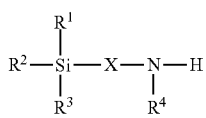
(I)

in which
R$^1$, R$^2$ and R$^3$ are identical or different radicals and are each a saturated or unsaturated, linear or branched, aliphatic or cycloaliphatic or an optionally substituted aromatic or araliphatic radical which has up to 18 carbon atoms and may optionally contain up to 3 heteroatoms from the group of oxygen, sulfur and nitrogen,
X is a linear or branched organic radical which has at least 2 carbon atoms and may optionally contain up to 2 imino groups (—NH—),
and
R$^4$ is hydrogen, a saturated or unsaturated, linear or branched, aliphatic or cycloaliphatic or an optionally substituted aromatic or araliphatic radical having up to 18 carbon atoms or a radical of the formula

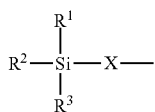

in which R$^1$, R$^2$, R$^3$ and X have the definition given above.

5. The modified polyisocyanate as in clause 4, characterized in that the silane compounds B) reactive toward isocyanate groups are N-methyl-3-aminopropyltrimethoxysilane, N-methyl-3-aminopropyltriethoxysilane, N-(n-butyl)-3-aminopropyltrimethoxysilane, N-(n-butyl)-3-aminopropyltriethoxysilane, bis(3-trimethoxysilylpropyl)amine and/or bis(3-triethoxysilylpropyl)amine.

6. The modified polyisocyanate as in any of clauses 1 to 4, characterized in that the silane compounds B) reactive toward isocyanate groups are aminosilanes of the general formula (II)

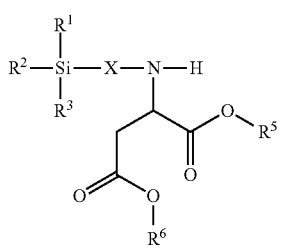
(II)

in which R$^1$, R$^2$ and R$^3$ have the definition given in clause 4,
X is a linear or branched organic radical having at least 2 carbon atoms and R$^5$ and R$^6$ are independently saturated or unsaturated, linear or branched, aliphatic or cycloaliphatic or aromatic organic radicals which have 1 to 18 carbon atoms, are substituted or unsubstituted and/or have heteroatoms in the chain.

7. The modified polyisocyanate as in clause 6, characterized in that the silane compounds B) reactive toward isocyanate groups are reaction products of 3-aminopropyltrimethoxysilane and/or 3-aminopropyltriethoxysilane with diethyl maleate.

8. The modified polyisocyanate as in any of clauses 1 to 4, characterized in that the silane compounds B) reactive toward isocyanate groups are aminosilanes of the general formula (IV)

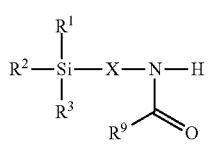
(IV)

in which R$^1$, R$^2$ and R$^3$ have the definition given in clause 4,
X is a linear or branched organic radical having at least 2 carbon atoms and
R$^9$ is a saturated linear or branched, aliphatic or cycloaliphatic organic radical having 1 to 8 carbon atoms.

9. The modified polyisocyanate as in clause 8, characterized in that the silane compounds B) reactive toward isocyanate groups are reaction products of 3-aminopropyltrimethoxysilane and/or 3-aminopropyltriethoxysilane with methyl formate and/or ethyl formate.

10. The modified polyisocyanate as in any of clauses 1 to 4, characterized in that the silane compounds B) reactive toward isocyanate groups are mercaptosilanes of the general formula (VI)

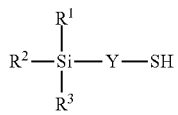
(I)

in which R$^1$, R$^2$ and R$^3$ have the definition given in clause 4 and
Y is a linear or branched organic radical having at least 2 carbon atoms.

11. The modified polyisocyanate as in clause 10, characterized in that the silane compounds B) reactive toward isocyanate groups are 3-mercaptopropyltrimethoxysilane and/or 3-mercaptopropyltriethoxysilane.

12. A process for preparing the modified polyisocyanates as claimed in clauses 1 to 11, characterized in that at least
A) one polyisocyanate based on 1,5-diisocyanatopentane is reacted with
B) at least one silane compound reactive toward isocyanate groups.

13. The use of the modified polyisocyanates as claimed in clauses 1 to 11 as a starting component in the production of polyurethane plastics.

14. The use of polyisocyanate mixtures comprising modified polyisocyanates as in clauses 1 to 11 and polyisocyanates which have uretdione, isocyanurate, iminooxadiazinedione, urethane, allophanate, biuret and/or oxadiazinetrione structure and bear aliphatically, cycloaliphatically, araliphatically and/or aromatically bonded isocyanate groups as starting component in the production of polyurethane plastics.
15. A coating composition comprising modified polyisocyanates as in clauses 1 to 11.
16. A coating composition comprising polyisocyanate mixtures comprising modified polyisocyanates as in clauses 1 to 11 and polyisocyanates which have uretdione, isocyanurate, iminooxadiazinedione, urethane, allophanate, biuret and/or oxadiazinetrione structure and bear aliphatically, cycloaliphatically, araliphatically and/or aromatically bonded isocyanate groups.
17. A substrate coated with a coating composition as in clause 15 or 16.

The invention claimed is:

1. A modified polyisocyanate obtained by reacting at least one polyisocyanate A) based on 1,5-diisocyanatopentane with at least one silane compound B) reactive toward isocyanate groups.

2. The modified polyisocyanate according to claim 1, wherein the polyisocyanate A) is an oligomeric polyisocyanate consisting of at least two 1,5-diisocyanatopentane molecules and having at least one of uretdione, isocyanurate, allophanate, biuret, iminooxadiazinedione, oxadiazinetrione structure and any mixtures thereof.

3. The modified polyisocyanate according to claim 1, wherein the polyisocyanates A) are oligomeric polyisocyanates consisting of at least two 1,5-diisocyanatopentane molecules and having
   a) a mean isocyanate functionality of 2.0 to 5.0 and
   b) an isocyanate group content of 11.0% to 26.0% by weight.

4. The modified polyisocyanate according to claim 1, wherein the silane compounds B) reactive toward isocyanate groups are aminosilanes of the general formula (I)

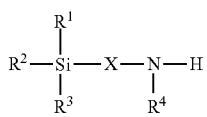

in which
R¹, R² and R³ are identical or different radicals and are each a saturated or unsaturated, linear or branched, aliphatic or cycloaliphatic or an optionally substituted aromatic or araliphatic radical which has up to 18 carbon atoms and may optionally contain up to 3 heteroatoms from the group of oxygen, sulfur and nitrogen,
X is a linear or branched organic radical which has at least 2 carbon atoms and may optionally contain up to 2 imino groups (—NH—),
and
R⁴ is hydrogen, a saturated or unsaturated, linear or branched, aliphatic or cycloaliphatic or an optionally substituted aromatic or araliphatic radical having up to 18 carbon atoms or a radical of the formula

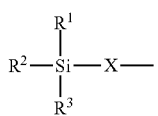

in which R¹, R², R³ and X have the definition given above.

5. The modified polyisocyanate according to claim 4, wherein the silane compounds B) reactive toward isocyanate groups are selected from the group consisting of N-methyl-3-aminopropyltrimethoxysilane, N-methyl-3-aminopropyltriethoxysilane, N-(n-butyl)-3-aminopropyltrimethoxysilane, N-(n-butyl)-3-aminopropyltriethoxysilane, bis(3-trimethoxysilylpropyl)amine, and bis(3-triethoxysilylpropyl)amine.

6. The modified polyisocyanate according to claim 1, wherein the silane compounds B) reactive toward isocyanate groups are aminosilanes of the general formula (II)

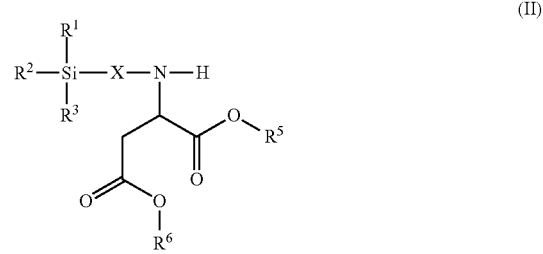

in which R¹, R² and R³ are as defined in claim 4,
X is a linear or branched organic radical having at least 2 carbon atoms and
R⁵ and R⁶ are independently saturated or unsaturated, linear or branched, aliphatic or cycloaliphatic or aromatic organic radicals which have 1 to 18 carbon atoms, are substituted or unsubstituted and/or have heteroatoms in the chain.

7. The modified polyisocyanate according to claim 6, wherein the silane compounds B) reactive toward isocyanate groups are reaction products of 3-aminopropyltrimethoxysilane and/or 3-aminopropyltriethoxysilane with diethyl maleate.

8. The modified polyisocyanate according to claim 1, wherein the silane compounds B) reactive toward isocyanate groups are aminosilanes of the general formula (IV)

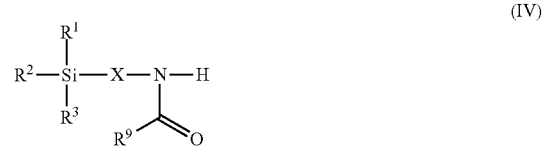

in which R¹, R² and R³ are as defined in claim 4,
X is a linear or branched organic radical having at least 2 carbon atoms and
R⁹ is a saturated linear or branched, aliphatic or cycloaliphatic organic radical having 1 to 8 carbon atoms.

9. The modified polyisocyanate according to claim 8, wherein the silane compounds B) reactive toward isocyanate groups are reaction products of 3-aminopropyltrimethoxysilane and/or 3-aminopropyltriethoxysilane with methyl formate and/or ethyl formate.

10. The modified polyisocyanate according to claim 1, wherein the silane compounds B) reactive toward isocyanate groups are mercaptosilanes of the general formula (VI)

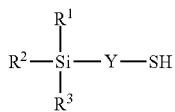
(VI)

in which R¹, R² and R³ have the definition given in claim 4 and

Y is a linear or branched organic radical having at least 2 carbon atoms.

11. The modified polyisocyanate according to claim 10, wherein the silane compounds B) reactive toward isocyanate groups are 3-mercaptopropyltrimethoxysilane and/or 3-mercaptopropyltriethoxysilane.

12. A process for preparing the modified polyisocyanates according to claim 1, wherein at least A) one polyisocyanate based on 1,5-diisocyanatopentane is reacted with B) at least one silane compound reactive toward isocyanate groups.

13. A process for production of polyurethane plastics, comprising: including as a starting component, the modified polyisocyanate as claimed in claims 1 to 11.

14. A process for production of polyurethane plastics comprising: including as a starting component, polyisocyanate mixtures comprising modified polyisocyanates as claimed in claims 1 to 11 and polyisocyanates which have uretdione, isocyanurate, iminooxadiazinedione, urethane, allophanate, biuret and/or oxadiazinetrione structure and bear aliphatically, cycloaliphatically, araliphatically and/or aromatically bonded isocyante groups.

15. A coating composition comprising the modified polyisocyanates according to claim 1.

16. A substrate coated with the coating composition according to claim 15.

17. A coating composition comprising polyisocyanate mixtures comprising modified polyisocyanates according to claim 1 and polyisocyanates which have uretdione, isocyanurate, iminooxadiazinedione, urethane, allophanate, biuret and/or oxadiazinetrione structure and bear aliphatically, cycloaliphatically, araliphatically and/or aromatically bonded isocyanate groups.

* * * * *